(12) United States Patent
Moribe

(10) Patent No.: US 12,212,719 B2
(45) Date of Patent: Jan. 28, 2025

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Shoei Moribe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/224,831

(22) Filed: Jul. 21, 2023

(65) Prior Publication Data

US 2024/0031495 A1 Jan. 25, 2024

(30) Foreign Application Priority Data

Jul. 22, 2022 (JP) ................................. 2022-117064

(51) Int. Cl.
*H04N 1/00* (2006.01)
*G06T 7/00* (2017.01)

(52) U.S. Cl.
CPC ......... *H04N 1/00037* (2013.01); *G06T 7/001* (2013.01); *H04N 1/00023* (2013.01); *G06T 2207/10024* (2013.01); *G06T 2207/30144* (2013.01)

(58) Field of Classification Search
CPC ............ H04N 1/00037; H04N 1/00023; G06T 7/001; G06T 2207/10024; G06T 2207/30144
See application file for complete search history.

(56) References Cited

U.S. PATENT DOCUMENTS

2016/0286054 A1* 9/2016 Kuri .......................... G01J 3/26

FOREIGN PATENT DOCUMENTS

JP 2009-119713 A 6/2009

* cited by examiner

*Primary Examiner* — Christopher Wait
(74) *Attorney, Agent, or Firm* — Venable LLP

(57) ABSTRACT

By an image forming apparatus comprising a reading unit configured to read a sheet on which a chart image is printed, the chart image including a first print pattern using a first color ink and a second print pattern using a second color ink whose color is different from the first color, containing at least part of the first print pattern, and having a predetermined density and a detection unit configured to detect deformation of the sheet in an area of the sheet based on a difference between a moisture amount in a portion corresponding to an area in which the chart image in the read image obtained by the reading unit is printed and a moisture amount in a portion corresponding to a non-printing area, determination of cockling is performed with a high accuracy.

22 Claims, 11 Drawing Sheets

IMAGE FORMING APPARATUS, CONTROL METHOD FOR IMAGE FORMING APPARATUS, AND STORAGE MEDIUM

BACKGROUND OF THE DISCLOSURE

Field of the Disclosure

The present disclosure relates to a technique for detecting sheet deformation.

Description of the Related Art

In an ink-jet printer, such a problem is known that in a case where an image is printed on a sheet by using an aqueous ink, the sheet is deformed due to moisture of the ink, and therefore, the quality of the printed material is impaired. Among sheet deformation, a phenomenon in which the sheet is deformed so that the sheet becomes wavy is called cockling. Cockling is caused by, in a case where areas between which a difference in the moisture amount is large are in close proximity to each other within a sheet, a difference in the amount of expansion and contraction of paper between the areas.

Japanese Patent Laid-Open No. 2009-119713 (in the following, referred to as Document 1) has disclosed a method of detecting cockling by using a density sensor mounted within a printer. In the method disclosed in Document 1, cockling is detected by utilizing the fact that the amount of received light of the density sensor changes in a case where the distance between the sheet and the density sensor changes.

SUMMARY OF THE DISCLOSURE

The image forming apparatus according to the present disclosure is an image forming apparatus that forms an image on a sheet by using a plurality of color inks and includes: a reading unit configured to read a sheet on which a chart image is printed, the chart image including a first print pattern using a first color ink and a second print pattern using a second color ink whose color is different from the first color, containing at least part of the first print pattern, and having a predetermined density; and a detection unit configured to detect deformation of the sheet in an area of the sheet based on a difference between a moisture amount in a portion corresponding to an area in which the chart image in the read image obtained by the reading unit is printed and a moisture amount in a portion corresponding to a non-printing area.

Further features of the present disclosure will become apparent from the following description of exemplary embodiments with reference to the attached drawings.

DESCRIPTION OF THE EMBODIMENTS

Figure 1:
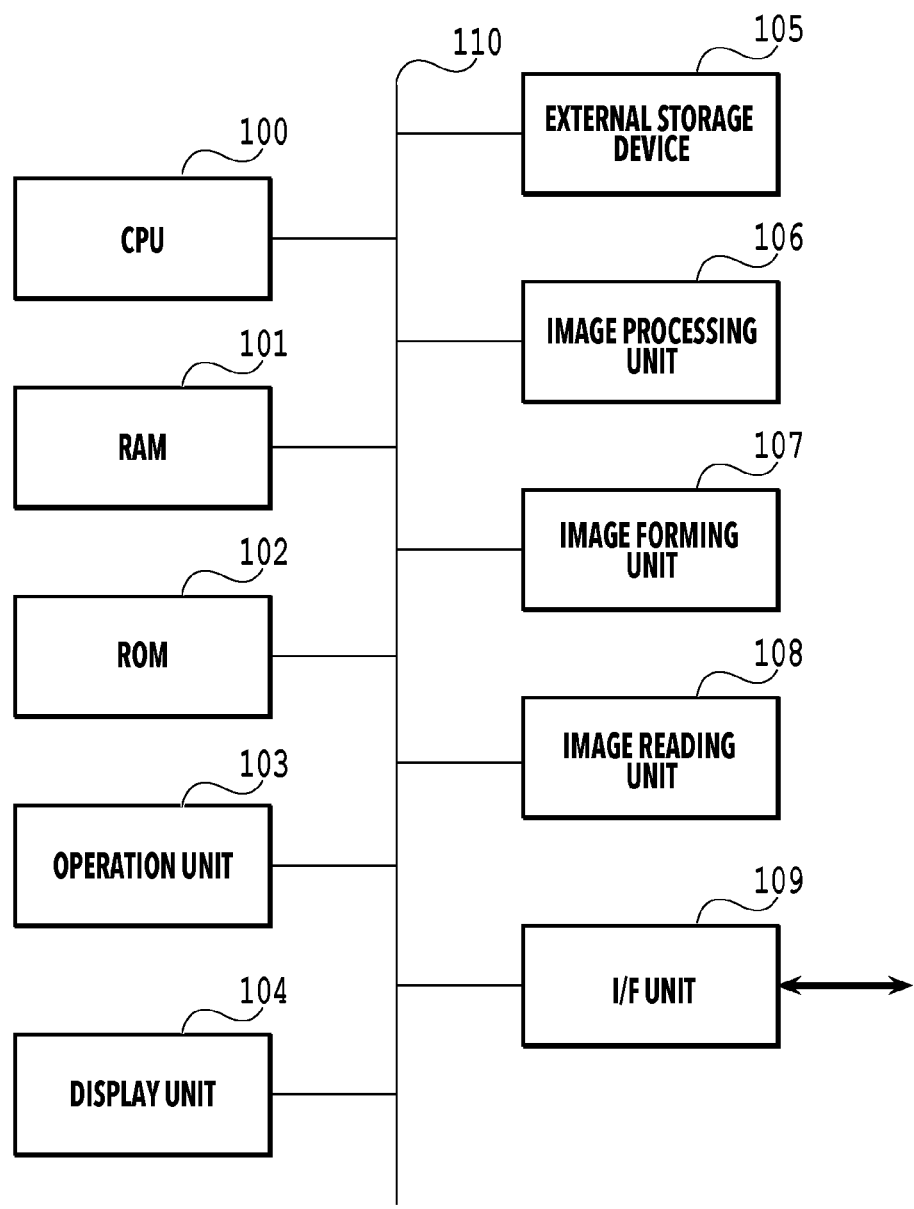
FIG. 1 is a diagram showing a hardware configuration of an image forming system.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

In the technique according to Document 1, there is a problem that in a case where there occurs density unevenness resulting from variations of the ejection amount of an ink or the like in the measurement-target printed material itself, it is not possible to distinguish the density unevenness from a change in density resulting from cockling. That is, there is a possibility that a change in the amount of received light of a density sensor due to density unevenness is erroneously determined to be cockling.

The present disclosure has been made in order to solve the above-described problem and an object thereof is to perform determination of cockling with a high accuracy.

First Embodiment

<Hardware Configuration of Image Forming System>

FIG. 1 is a diagram showing a hardware configuration of an image forming system according to the present embodiment. The image forming system of the present embodiment comprises a CPU 100, a RAM 101, a ROM 102, an operation unit 103, a display unit 104, an external storage device 105, an image processing unit 106, an image forming unit 107, an image reading unit 108, an I/F unit 109 (interface unit), and a bus 110.

The CPU (Central Processing Unit) 100 controls the operation of the entire image forming system by using input data and computer programs stored in the RAM or the ROM, to be described later. Here, explanation is given by taking a case as an example where the CPU 100 controls the entire image forming system, but it may also be possible to control the entire image forming system by each of a plurality of pieces of hardware sharing its processing.

The RAM (Random Access Memory) 101 has a storage area for temporarily storing computer programs and data read from the external storage device 105 and data received from the outside via the I/F unit 109. Further, the RAM 101 is used as a storage area that is used in a case where the CPU 100 performs various kinds of processing and as a storage area that is used in a case where the image processing unit 106 performs image processing.

The ROM (Read Only Memory) 102 has a storage area for storing setting parameters used to set each unit in the image forming system, boot programs and the like.

The operation unit 103 is an input device, such as a keyboard and a mouse, and receives the operation (instructions) by an operator. Due to this, it is possible for an operator to input various instructions to the CPU 100.

The display unit 104 is a display device, such as a liquid crystal screen, and is capable of displaying results of processing by the CPU 100 in images, characters and the like. In a case where the display unit 104 is a touch panel capable of detecting a touch operation, the display unit 104 may function as part of the operation unit 103.

The external storage device 105 is a large-capacity information storage device represented by a hard disk drive. In the external storage device 105, operating systems, computer programs, data and the like for causing the CPU 100 to perform various kinds of processing are stored. Further, the external storage device 105 stores temporary data (for example, image data that is input and output, threshold value matrix used in the image processing unit 106 and the like) that is generated by the processing of each unit. The computer programs and data stored in the external storage device 105 are read appropriately in accordance with the control by the CPU 100 and stored in the RAM 101 and taken as the target of processing by the CPU 100.

The image processing unit 106 is implemented as a processor or a dedicated image processing circuit capable of executing computer programs and performs various kinds of image processing for converting image data input as a printing target into image data that the image forming apparatus, to be described later, can output. A configuration may also be acceptable in which the CPU 100 performs various kinds of image processing as the image processing unit 106 instead of preparing a dedicated processor as the image processing unit 106.

The image forming unit 107 forms an image on a printing sheet by using a printing material based on image data received directly from the image processing unit 106 or received via the RAM or the external storage device.

The image reading unit 108 is an image sensor (line sensor or area sensor) for capturing a printed image formed on the printing sheet by the image forming unit 107.

The I/F unit 109 functions as an interface for connecting the image forming system and an external device. Further, the I/F unit 109 also functions as an interface for performing transmission and reception of data with a communication device by using infrared communication, a wireless LAN (Local Area Interface) and the like, or as an interface for connecting to the internet. Due to this, it is possible to perform transmission and reception of data, for example, such as an input image, with an external device.

Each of the above-described units is connected to the bus 110 and capable of performing transmission and reception of data via the bus 110. However, the image forming system may have a configuration in which each of the units explained above (for example, the image forming unit 107) is connected via the I/F unit 109.

<Hardware Configuration of Image Forming Unit and Image Obtaining Unit>

FIG. 2A to FIG. 2D are each a schematic diagram showing the image forming unit 107 according to the present embodiment. The image forming unit 107 in the present embodiment is an ink-jet method (IJ method) printer that forms an image by ejecting the ink onto a printing sheet from nozzles.

Figure 2B:
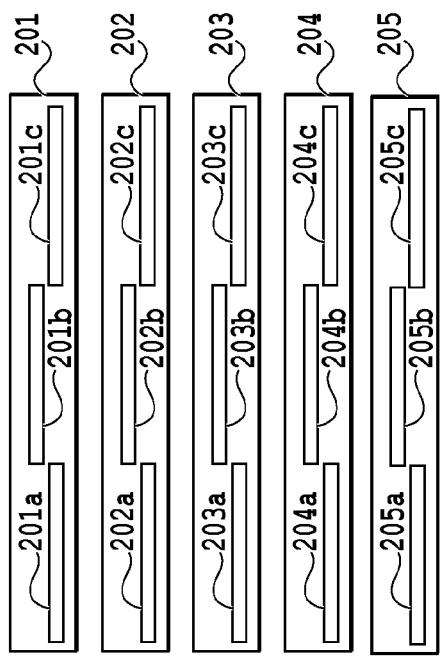
FIG. 2B is a schematic diagram showing the image forming unit 107.
Figure 2C:
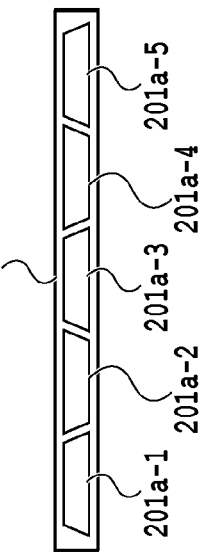
FIG. 2C is a schematic diagram showing the image forming unit 107.
Figure 2D:
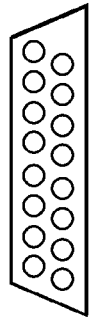
FIG. 2D is a schematic diagram showing the image forming unit 107.
Figure 2A:
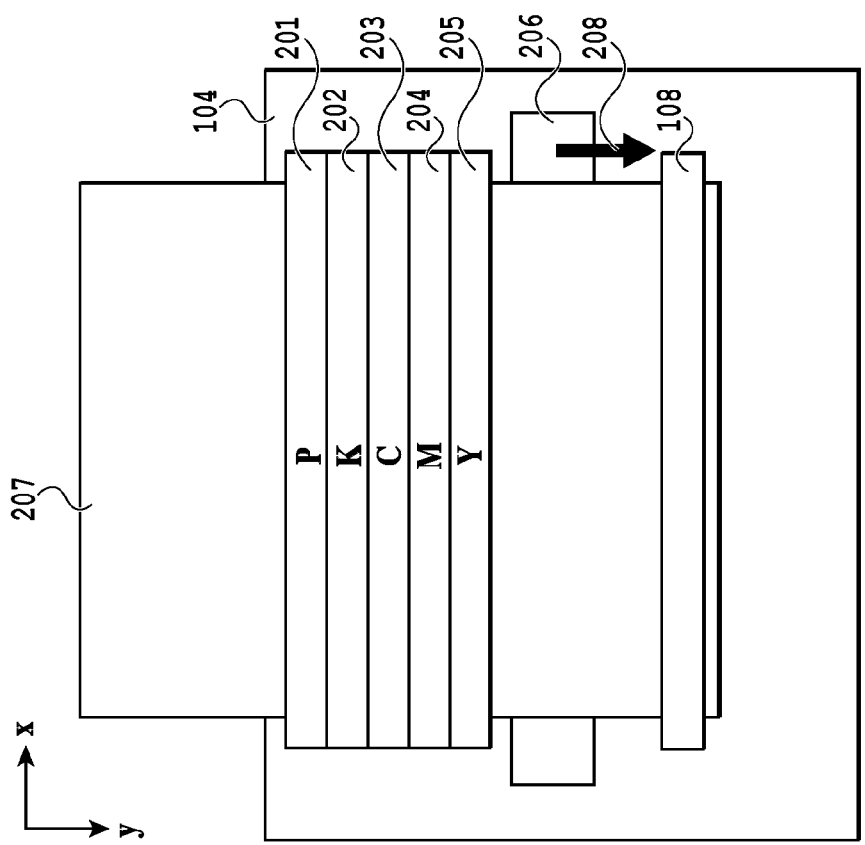
FIG. 2A is a schematic diagram showing an image forming unit 107.

As shown in FIG. 2A, the image forming unit 107 comprises a plurality of print heads 202 to 205 corresponding to black (K), cyan (C), magenta (M), and yellow (Y), respectively. Further, the image forming unit 107 comprises a print head that ejects primer (P) for fixing the ink onto a printing sheet 207. The primer is a colorless, transparent liquid.

Each of the print heads 201 to 205 includes a plurality of combined head modules as shown in FIG. 2B. Head modules 201a, 201b, and 201c configuring the print head 201 are arranged so as to be located alternately on the lower side and the upper side in the conveyance direction.

Further, as shown in FIG. 2C, the head module 201a includes a plurality of chip modules 201a-1 to 201a-5. It is assumed that each chip module is connected to a substrate independently of one another.

FIG. 2D is a diagram in a case where one of the chip modules is viewed from the side of the paper surface and showing that the chip module comprises a plurality of nozzles. In the example shown in FIG. 2D, the chip module comprises sixteen nozzles. The resolution of the nozzle arrangement is 1,200 dpi.

The printing sheet 207 is conveyed in the direction indicated by an arrow 208 in FIG. 2A by a conveyance roller 206 (and another roller (not shown schematically)) rotating by a driving force of a motor (not shown schematically). Then, while the printing sheet 207 is conveyed, by the ink and the primer being ejected from a plurality of nozzles of each of the print heads 201 to 205 in accordance with print data, an image corresponding to one raster corresponding to the nozzle column of each print head is formed sequentially. As described above, by repeating the ejection operation from each print head for the printing sheet that is conveyed, for example, it is possible to print an image corresponding to one page.

Further, as shown in FIG. 2A, the image reading unit 108 is a line sensor that covers the entire surface of the printing sheet, which is disposed downstream of the print heads 201 to 205. That is, after an image is formed by the print heads 201 to 205, the printing sheet 207 is conveyed to the image reading unit 108. The image reading unit 108 sequentially captures the printing sheet that is conveyed and obtains the captured image as, for example, RGB information and luminance information and stores the information in the external storage device 105 as two-dimensional image data.

<Function Configuration of Image Processing Unit>

Figure 3:
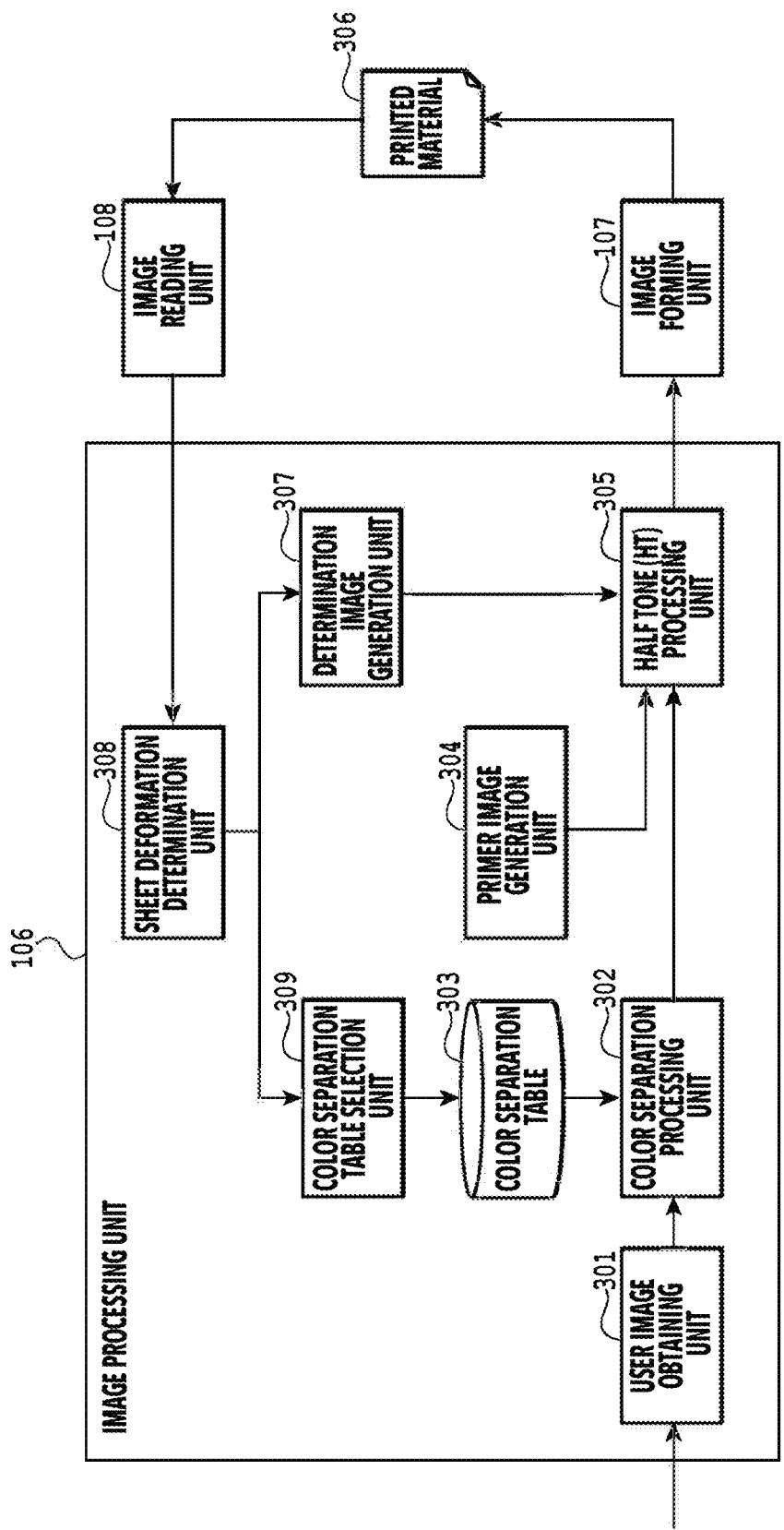
FIG. 3 is a configuration diagram of an image processing unit 106 in a first embodiment.

In the following, by using FIG. 3 and FIG. 4, the image processing unit 106 is explained. FIG. 3 shows the configuration of the image processing unit 106 and FIG. 4 is a flowchart showing a processing flow in a case where a normal user image is printed.

As shown in FIG. 3, in the present embodiment, determination results of a sheet deformation determination unit 308 are sent to a determination image generation unit 307 and a color separation table selection unit 309.

Figure 4:
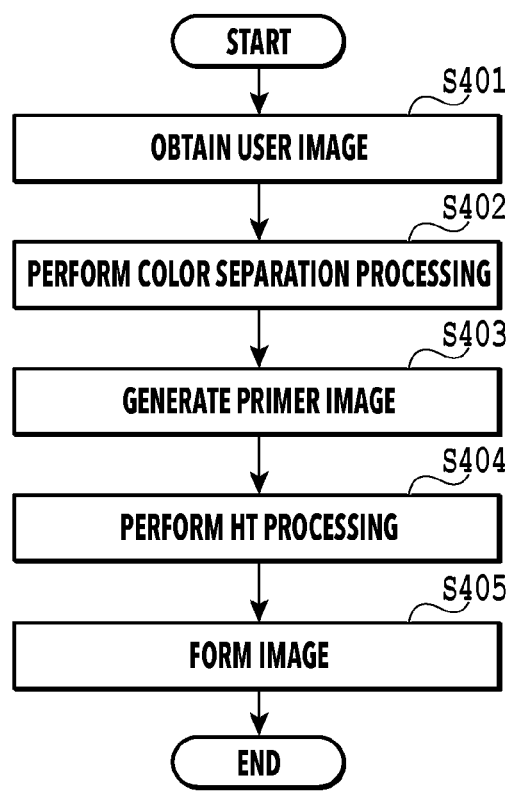
FIG. 4 is a flowchart showing processing to print a user image.

At S401 in FIG. 4, a user image obtaining unit 301 obtains an arbitrary input image designated by a user. In the present embodiment, it is assumed that the input image is image data in which each of RGB is represented by eight bits. After the user image obtaining unit 301 obtains an input image, the processing advances to S402.

At S402, a color separation processing unit 302 separates RGB data into 16-bit tone data (density data) of C (cyan), M (magenta), Y (yellow), and K (black), which are ink colors of the printing apparatus. In the ink color separation processing, a color separation table 303 is used. The color separation table 303 is a lookup table (LUT) storing a correspondence relationship between RGB and CMYK. As the color separation table 303, one that is selected by the color separation table selection unit 309 for each type of printing sheet is used. Details of color separation table selection processing will be described later. After the color separation processing unit 302 performs color separation processing into CMYK, the processing advances to S403.

At S403, a primer image generation unit 304 generates 16-bit image data of P (primer). The primer image generation unit 304 generates an image in which the pixel value of primer is taken to be P1 at the position of the pixel whose pixel value of one of the CMYK images is larger than or equal to 0 and the pixel value of primer is taken to be P2 at the pixel position other than the above-described pixel position. In the present embodiment, P1 is taken to be 8,192 (P1=8,192) and P2 is taken to be 0 (P2=0). After the primer image generation unit 304 generates primer image data, the processing advances to S404.

At S404, an HT processing unit 305 (Half Tone processing unit) performs quantization processing for the CMYK images and the primer image described above. In the present embodiment, 1-bit binary data corresponding to five planes of CMYK and P is generated. As the quantization processing method, in the present embodiment, the publicly known dither method is used, but another pseudo halftone processing, such as the error diffusion method, may be used. After the HT processing unit 305 performs the quantization processing, the processing advances to S405.

At S405, the image forming unit 107 drives the print head based on dot data obtained by quantization and performs printing by ejecting each color ink and primer onto a printing sheet. After the image formation onto the printing sheet is completed, a printed material 306 on which a user image is printed is obtained.

<Color Separation Table Selection Processing>

Figure 5:
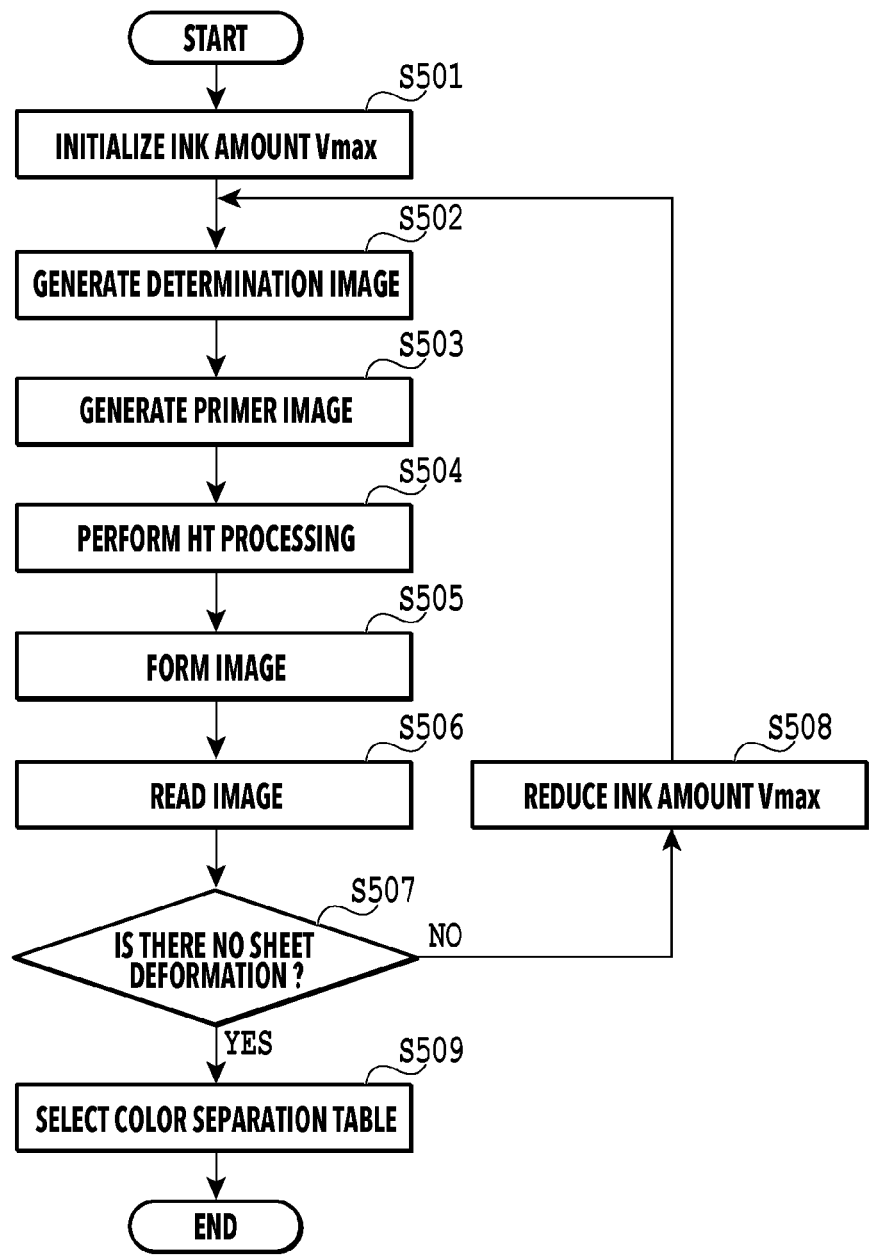
FIG. 5 is a flowchart showing processing to determine a color separation table in the first embodiment.

Next, by using FIG. 5, the color separation table selection processing is explained. FIG. 5 is a flowchart showing a processing flow to determine the color separation table 303 that is used.

At S501, the determination image generation unit 307 initializes a maximum value Vmax of an ink ejection amount. In the present embodiment, initialization is performed with 65,535, which is the maximum value that can be represented by 16 bits. After the initialization of the maximum value Vmax of the ink ejection amount is completed, the processing advances to S502.

Figure 6B:
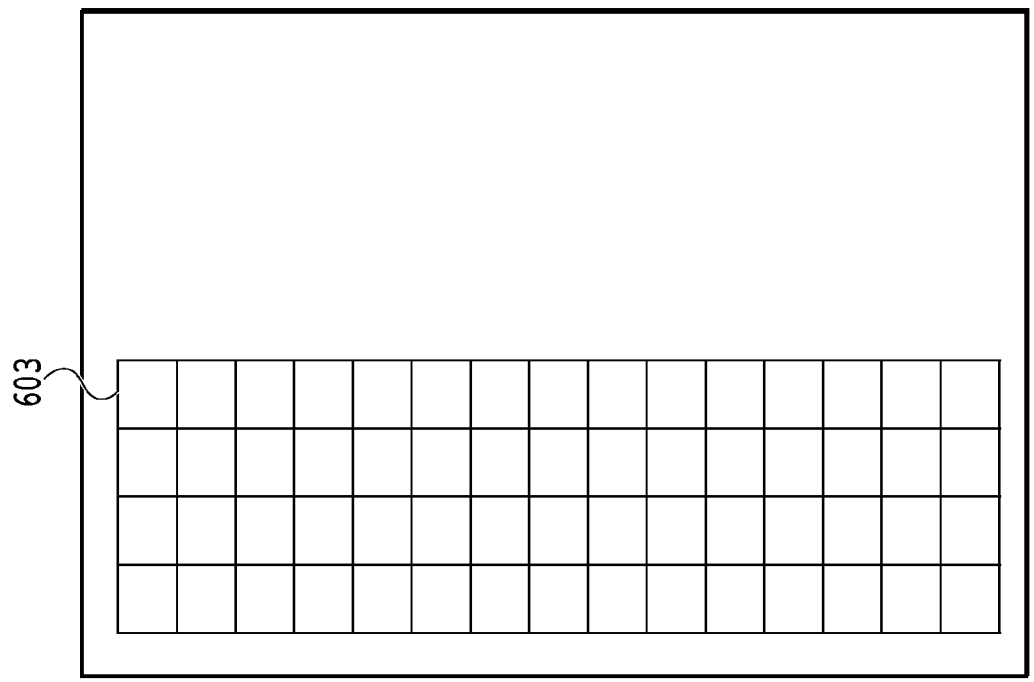
FIG. 6B is a diagram showing an example of a determination image in the first embodiment.
Figure 6A:
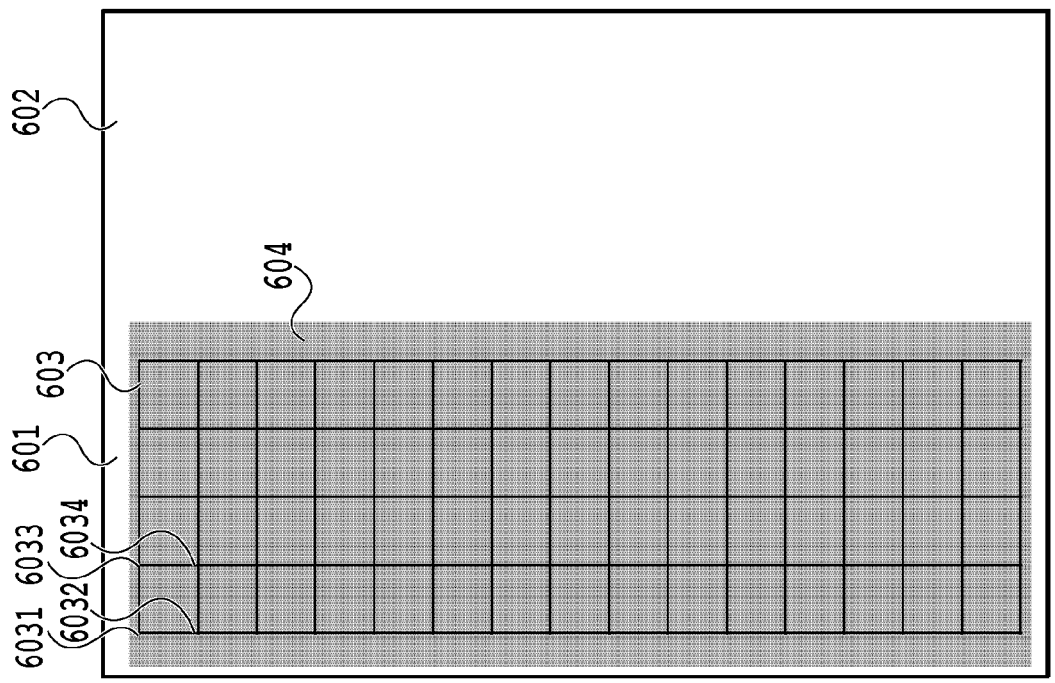
FIG. 6A is a diagram showing an example of a determination image in the first embodiment.

At S502, the determination image generation unit 307 generates a determination image (chart image). The determination image is a 16-bit image of CMYK, like the user image. FIG. 6A shows an example of the determination image.

The determination image in FIG. 6A includes an area 601 that is a portion whose moisture amount is large and an area 602 that is a portion whose moisture amount is small. In FIG. 6A, the left half corresponds to the area 601 and the right half corresponds to the area 602.

In the area 601, a determination image in which a grid pattern 603 which is printed in K ink and is a print pattern in which a specific design is repeated regularly and a uniform density pattern 604 which is printed in Y ink, includes the grid pattern 603 and has a predetermined density are overlapped, is printed. At this time, the determination image is generated so that the ink ejection amount of the uniform density pattern 604 becomes Vmax. After the determination image generation unit 307 generates the determination image, the processing advances to S503.

At S503, the primer image generation unit 304 generates 16-bit image data of P (primer). As at the time of user image printing, the primer image generation unit 304 generates an image in which the pixel value of primer is taken to be P1 at the position of the pixel whose pixel value of one of CMYK images is larger than or equal to 0 and the pixel value of primer is taken to be P2 at the pixel position other than the above-described pixel position. In the present embodiment, P1 is taken to be 8,192 (P1=8,192) and P2 is taken to be P2 (P2=0). After the primer image generation unit 304 generates the primer image data, the processing advances to S504.

At S504, the HT processing unit 305 performs quantization processing for the determination image and the primer image described above. After the HT processing unit 305 performs the quantization processing, the processing advances to S505.

At S505, the image forming unit 107 drives the print head and performs image formation onto a printing sheet. After the image formation onto the printing sheet is completed, the printed material 306 on which the determination image is printed is obtained. After the printed material 306 on which the determination image is printed is obtained, the processing advances to S506.

At S506, the image reading unit 108 captures the printed material 306 and obtains a read image. In the present embodiment, the read image is obtained as an 8-bit luminance image whose resolution is 1,200 dpi. After the read image is obtained, the processing advances to S507.

At S507, the sheet deformation determination unit 308 determines the presence/absence of sheet deformation. Details of sheet deformation determination processing will be described later. In a case where the sheet deformation determination unit 308 determines that there is sheet deformation, the processing advances to S508. In a case where the sheet deformation determination unit 308 determines that there is no sheet deformation, the processing advances to S509.

At S508, the maximum value Vmax of the ink ejection amount is reduced and the processing returns to S502. In the present embodiment, 8,192 is subtracted from the maximum value Vmax of the current ink ejection amount. The changed value of Vmax is sent out to the determination image generation unit 307 from the sheet deformation determination unit 308.

At S509, the color separation table selection unit 309 selects a color separation table whose maximum ink ejection amount is less than or equal to Vmax from among a plurality of color separation tables stored in the external storage device 105 and the color separation table selection processing is finished. The correspondence of the selected color separation table with the printing sheet is stored.

<Sheet Deformation Determination Processing>

Figure 7:
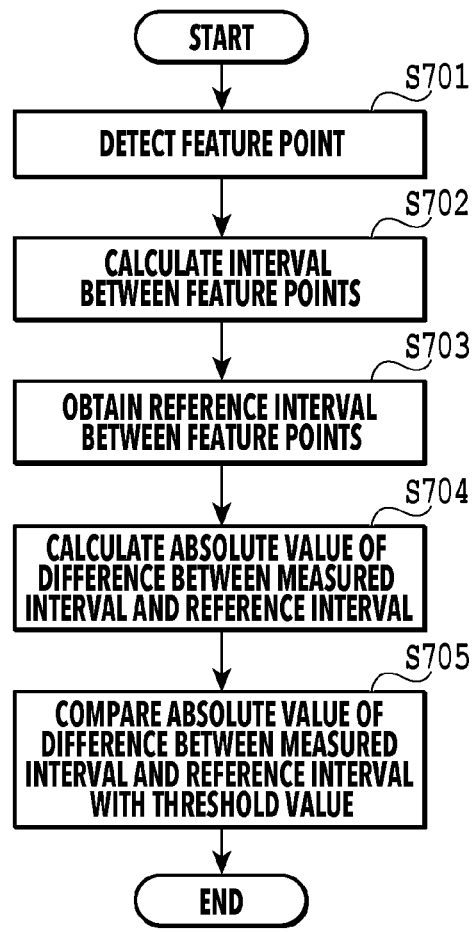
FIG. 7 is a flowchart showing processing to determine sheet deformation in the first embodiment.

By using FIG. 7, the sheet deformation determination processing that is performed in the sheet deformation determination unit 308 is explained. FIG. 7 is a flowchart showing a flow of the sheet deformation determination processing.

At S701, a feature point is detected from the read image obtained at S506. In the present embodiment, after detecting an edge by using the publicly known Sobel filter, a feature point is detected by detecting the intersection of edges. In the following, for simplification, explanation is given by taking four points as detected feature points, which are shown as a point 6031 to a point 6034 in FIG. 6A. The number of feature points may be any number larger than or equal to two. After the feature points are detected from the read image, the processing advances to S702.

At S702, the interval between the detected feature points is calculated. In the present embodiment, attention is focused on only the distance in the longitudinal direction of the sheet and a distance d1 between the point 6031 and the point 6032 and a distance d2 between the point 6033 and the point 6034 are calculated. After the distances d1 and d2 are calculated, the processing advances to S703.

At S703, a reference interval between the feature points is obtained. Here, the reference interval is a distance between feature points, which is supposed in a case where there is no sheet deformation. The reference interval is calculated from the image data of the determination image generated by the determination image generation unit 307. The reference interval between the point 6031 and the point 6032 is taken to be d1* and the reference interval between the point 6033 and the point 6034 is taken to be d2*. After the reference intervals between the feature points are obtained, the processing advances to S704.

At S704, the absolute value of the difference between the interval between the feature points obtained at S702 and the reference interval obtained at S703 is calculated.

That is, Δd1 and Δd2 are calculated by taking Δd1 to be |d1−d1*|(Δd1=|d1−d1*|) between the point 6031 and the point 6032 and Δd2 to be |d2−d2*|(Δd2=|d2−d2*|) between the point 6033 and the point 6034. After the Δd1 and Δd1 are calculated, the processing advances to S705.

At S705, in a case where the maximum value of the absolute value of the difference between the interval between the feature points obtained at S702 and the reference interval obtained at S703, which is calculated at S704, is larger than a threshold value, it is determined that there is sheet deformation.

In the above-described explanation, the example is explained in which the determination image is printed on the left half of the sheet, but the determination image is not limited to this and in a case where it is possible to determine sheet deformation, the determination image may be an image printed in a smaller area. Further, it may also be possible to determine sheet deformation by printing the determination image on the entire sheet.

Modification Example

In the present embodiment, the example is explained in which the color separation table selection unit 309 selects a color separation table from among the plurality of color separation tables stored in the external storage device 105, but the present disclosure is not limited to the above-described example. For example, it is also possible to apply the present disclosure to a configuration comprising a generation unit configured to generate a color separation table so that the ink ejection amount is less than or equal to Vmax, in place of selecting a color separation table.

Further, it may also be possible to employ a configuration in which a user is notified of the maximum ink ejection amount of the image forming apparatus and based on this value, the user sets the maximum ink ejection amount to an external color separation table generation unit. In a case where this method is employed, based on the maximum ink ejection amount set by a user, the image forming apparatus prints the determination image and the user checks the presence/absence of the occurrence of sheet deformation due to cockling. In a case of checking the occurrence of sheet deformation due to cockling, the user changes the setting of the maximum ink ejection amount of the external color separation table generation unit and prints the determination image again and checks the presence/absence of the occurrence of sheet deformation due to cockling. By repeating this process, it is made possible for a user to determine the maximum ink ejection amount in which the sheet deformation due to cockling does not occur.

Further, the example is explained in which the intersection of edges is used in a case where the sheet deformation determination unit 308 detects the feature point, but any method can be selected as the feature point detection method. It may also be possible to calculate the feature amount by using the publicly known Harris corner detection method or the like.

Further, the example is explained in which the determination image that is generated by the determination image generation unit 307 is the uniform density pattern 604 shown in FIG. 6A, but the pattern is not limited to a uniform pattern as long as it is possible to provide a sufficient moisture amount to the area 601. For example, printing a pattern that avoids the vicinity of the grid pattern 603 is appropriate to the suppression of bleeding of the grid pattern 603.

Further, in order to suppress the bleeding, it may also be possible to employ a configuration in which first, only the grid pattern 603 is printed and dried and then the printed material is returned by using the double-sided printing conveyance mechanism and the uniform density pattern 604 is printed and scanned.

Furthermore, the pattern for detecting a feature point is not limited to the grid pattern and the pattern is only required to be capable of detecting the position of a feature point. FIG. 8A to FIG. 8G show a plurality of examples of other patterns.

Figure 8D:
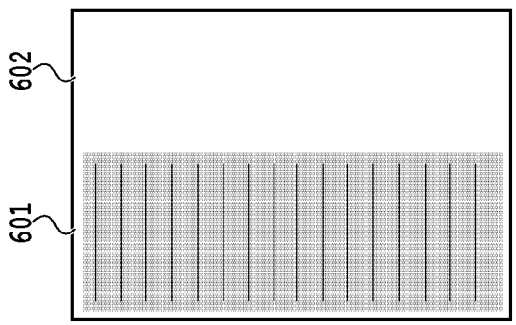
FIG. 8D is a diagram showing a modification example of a determination image.
Figure 8C:
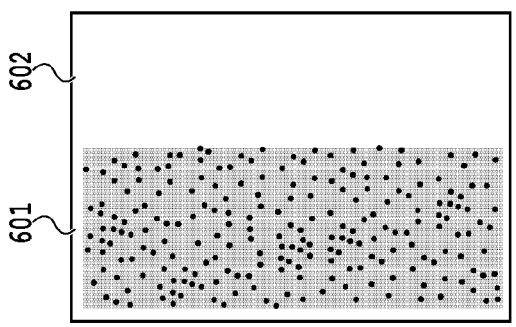
FIG. 8C is a diagram showing a modification example of a determination image.
Figure 8B:
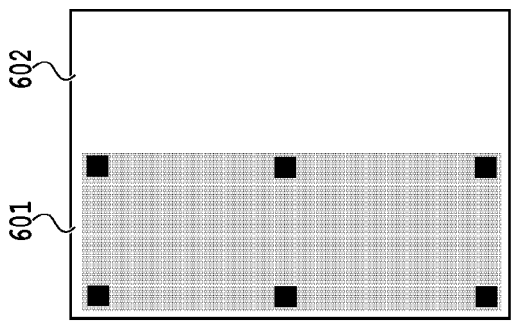
FIG. 8B is a diagram showing a modification example of a determination image.
Figure 8A:
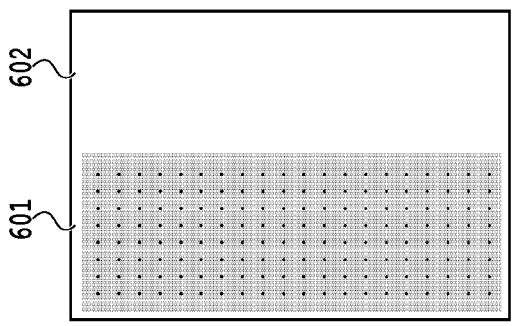
FIG. 8A is a diagram showing a modification example of a determination image.
Figure 8G:
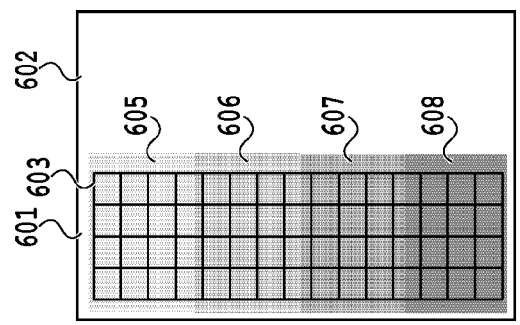
FIG. 8G is a diagram showing a modification example of a determination image.
Figure 8F:
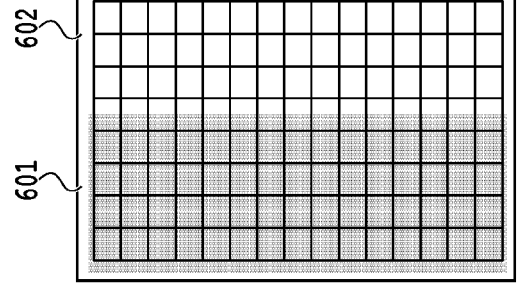
FIG. 8F is a diagram showing a modification example of a determination image.

FIG. 8A is an example in which dot patterns arranged regularly are used. In this case, it is possible to use the position of the centroid of each dot as a feature point.

FIG. 8B is an example in which rectangular patterns are arranged. In this case, it is possible to use the corner corresponding to the four corners of each rectangle as a feature point.

FIG. 8C is an example of random dot patterns. In this case, it is possible to use the Euclid distance between the selected dot and a dot in the vicinity thereof as the distance between feature points in place of the distance in the longitudinal direction of the image. In a case of FIG. 8C, the distance between feature points is not a constant interval but changes based on the selected dot and the dot in the vicinity thereof.

FIG. 8D is an example configured by only lines in the short-side direction (width direction). In this case, the edge is a set of feature points, and therefore, it is possible to extend this example to an aspect in which sheet deformation is determined by using the amount of change in the interval between edges.

Figure 8E:
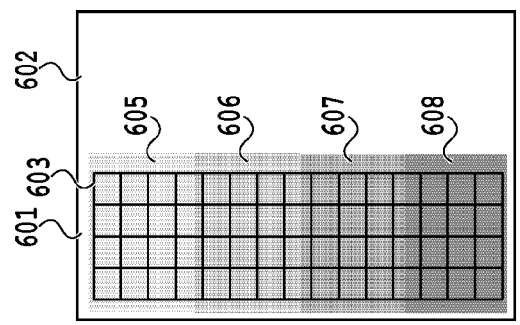
FIG. 8E is a diagram showing a modification example of a determination image.

FIG. 8E is an example in which the grid pattern 603 is printed also in the area 602 whose moisture amount is low. In this example, it is possible to use the distances corresponding to the feature point 6031 to the feature point 6034 shown in FIG. 6A as the alternatives of the reference intervals in the area 602 whose moisture amount is low.

Further, the case where sheet deformation occurs in the longitudinal direction of the image is explained, but it is known that the direction of sheet deformation is affected by the paper grain. Because of this, it is possible to use the image in which the determination image is rotated 90 degrees by taking into consideration the paper grain as in FIG. 8F. In this case, as the distance between feature points, attention is focused on only the distance in the short-side direction (width direction) of the sheet.

Further, it is also possible to repeat printing and measurement while gradually changing the ink amount of patterns whose density is uniform. As shown in an area 605 to an area 608 in FIG. 8G, it is also possible to arrange a plurality of patterns whose ink amounts are different on the sheet. In this case, it is possible to obtain the maximum value Vmax of the appropriate ink ejection amount by extracting the feature point for each area of the area 605 to the area 608 and determining the presence/absence of sheet deformation.

In each case, it is desirable for the arrangement of feature points to be denser in the sheet deformation direction than in the direction perpendicular to the sheet deformation direction.

In the present embodiment, the example is explained in which the grid pattern 603 of the determination image is printed in the K ink and the uniform density pattern 604 is printed in the Y ink. As long as the color of ink in which the grid pattern 603 is printed and the color of ink in which the uniform density pattern 604 is printed are different, the color of ink in which the grid pattern 603 is printed and the color of ink in which the uniform density pattern 604 is printed may be selected arbitrarily. Further, it may also be possible to fix the ink in which the grid pattern 603 is printed to the K ink and select a color different from that of the K ink as a color of ink in which the uniform density pattern 604 is printed.

In the present embodiment, the luminance of the determination image is measured in the image reading unit 108 and it is preferable to select both the inks so that the luminance of the ink in which the grid pattern 603 is printed is lower than the luminance of the ink that is used for the uniform density pattern 604. Due to this, it is made possible to easily obtain the feature point even in the state where the inks overlap.

To be stricter, it is important for the image reading unit 108 to easily detect a feature point. For example, in a case where the image reading unit 108 is capable of detecting infrared radiation, it is preferable to print the grid pattern 603 in the ink whose absorptance of infrared radiation is high and print the uniform density pattern 604 in the ink whose absorptance of infrared radiation is low.

Further, the dominant cause of sheet deformation is the moisture amount, and therefore, it may also be possible to print the uniform density pattern 604 by a printing material other than the ink. That is, it may also be possible to perform printing by using the primer and it may also be possible to design a configuration of the apparatus in which moisture of the primer is provided on the sheet. In this case, the ink amount corresponding to the provided moisture amount is calculated from the moisture content of the primer.

Although the example is explained in which sheet deformation is determined by using only the change in the distance between feature points, it may also be possible to use the sheet deformation determination by the change in density in combination therewith, which is explained as the conventional technique. For example, by determining that there is sheet deformation in a case where the change in the distance between feature points is larger than or equal to a predetermined value and the measured change in density is larger than or equal to a predetermined value, it is made possible to reduce the possibility of erroneous determination.

By performing the processing control explained above, according to the present embodiment, it is made possible to perform determination of sheet deformation due to cockling with a high accuracy.

Second Embodiment

In the first embodiment, the example is explained in which the maximum value Vmax of the ink ejection amount of the color separation table is obtained based on the determination results of sheet deformation. In the second embodiment, an example is explained in which a primer amount P2 of a primer image in a non-printing area is obtained based on determination results of sheet deformation. Points different from those of the first embodiment described above are explained mainly and explanation of the same points as those of the first embodiment is omitted.

<Primer Amount Determination Processing>

Figure 9:
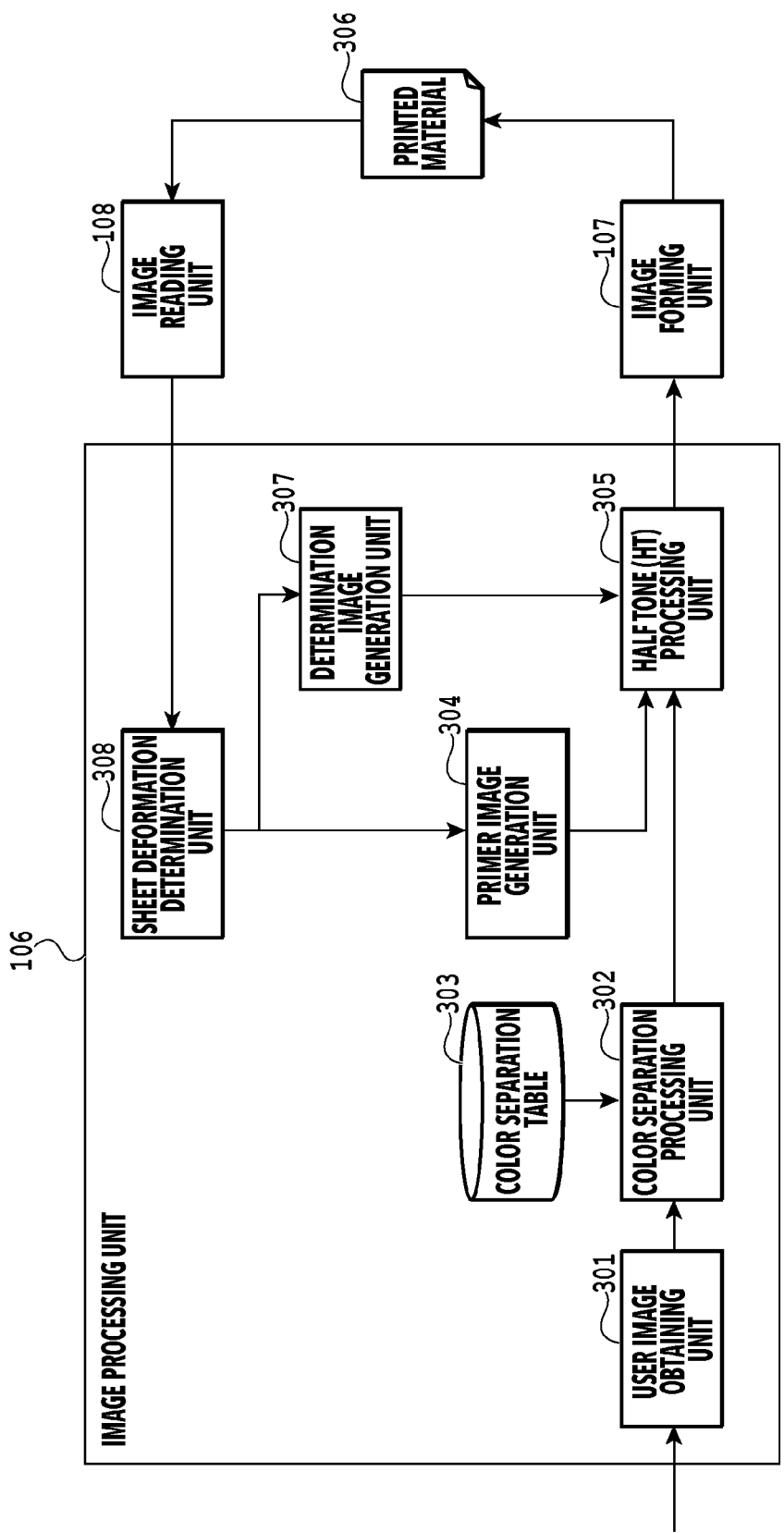
FIG. 9 is a configuration diagram of the image processing unit 106 in a second embodiment.

In the following, by using FIG. 9 and FIG. 10, the primer amount determination processing is explained. FIG. 9 is a diagram showing the configuration of the image processing unit 106 in the second embodiment and FIG. 10 is a diagram showing a flowchart of the primer amount determination processing in the second embodiment.

As shown in FIG. 9, different from the first embodiment, the determination results of the sheet deformation determination unit 308 are sent to the primer image generation unit 304 and the determination image generation unit 307.

Figure 10:
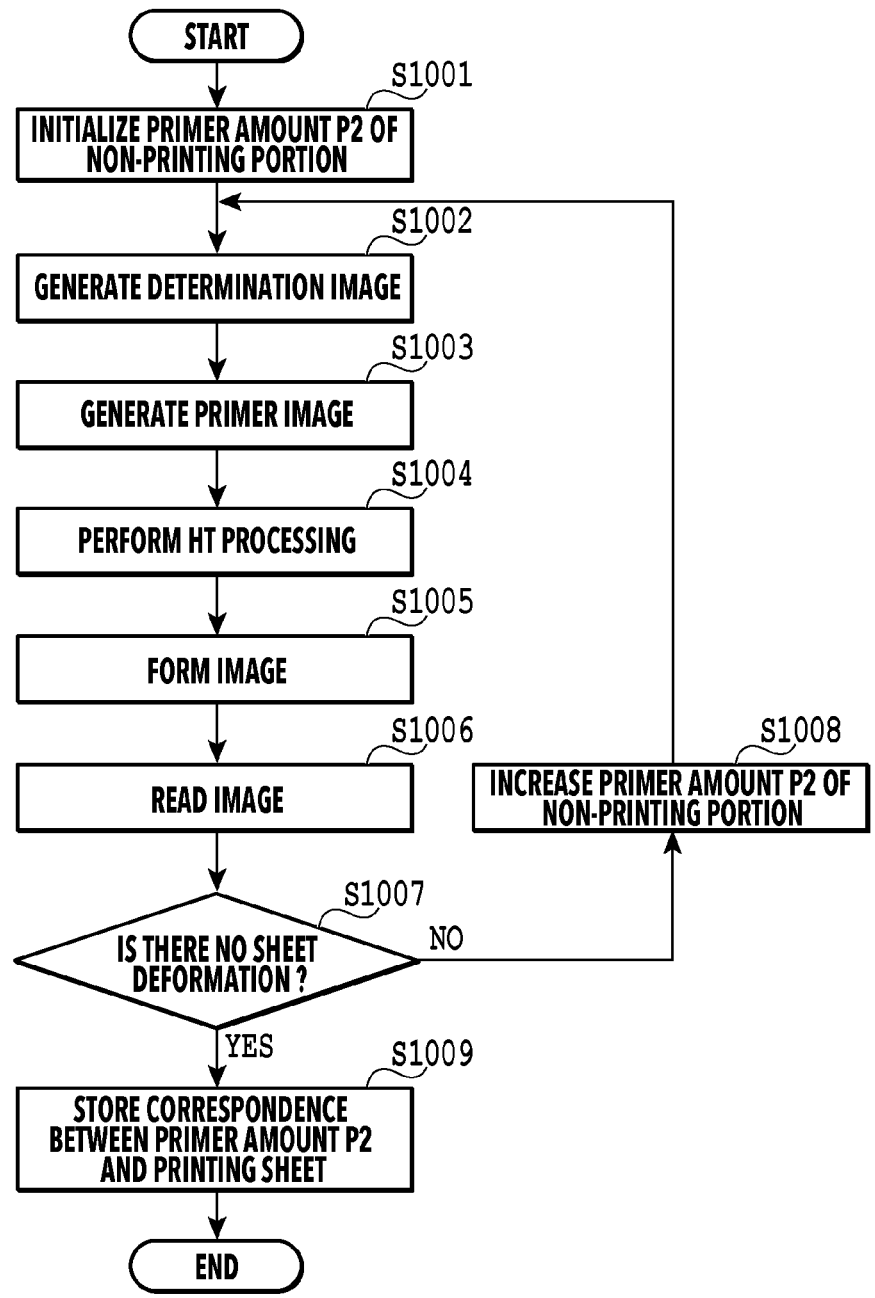
FIG. 10 is a flowchart showing primer amount determination processing in the second embodiment.

In the primer amount determination processing shown in FIG. 10, at S1001, the non-printing area primer amount P2 is initialized. In the second embodiment, P2 is initialized to 0. After the initialization of the non-printing area primer amount P2 is completed, the processing advances to S1002.

At S1002, the determination image generation unit 307 generates a determination image. An example of a determination image is shown in FIG. 6A. After the determination image generation unit 307 generates a determination image, the processing advances to S1003.

At S1003, the primer image generation unit 304 generates 16-bit image data of P (primer). The primer image generation unit 304 generates an image in which the pixel value is taken to be P1 at the position of the pixel whose pixel value of one of the CMYK images is larger than or equal to 0 and the pixel value is taken to be P2 at the pixel position other than the above-described pixel position. In the second embodiment. P1 is taken to be 8,192 (P1=8,192). After the primer image generation unit 304 generates a primer image, the processing advances to S1004.

At S1004, the HT processing unit 305 performs quantization processing for the determination image and the primer image described above. After the HT processing unit 305 completes the quantization processing, the processing advances to S1005.

At S1005, the image forming unit 107 performs image formation by driving the print head. After the image formation is completed, the printed material 306 is obtained. After the image forming unit 107 generates the printed material 306, the processing advances to S1006.

At S1006, the image reading unit 108 obtains a read image by capturing the printed material 306. After the image reading unit 108 obtains the read image, the processing advances to S1007.

At S1007, the sheet deformation determination unit 308 determines the presence/absence of sheet deformation. In a case where the sheet deformation determination unit 308 determines that there is sheet deformation, the processing advances to S1008. In a case where the sheet deformation determination unit 308 determines that there is no sheet deformation, the processing advances to S1009.

At S1008, the primer amount P is increased and the processing returns to S1002. In the second embodiment, 8,192 is added to the current primer amount P2. The P2 to which 8,192 is added is sent out from the sheet deformation determination unit 308 to the primer image generation unit 304.

At S1009, the primer image generation unit 304 stores a correspondence between the primer amount P2 and the printing sheet and the primer amount determination processing is finished.

As explained above, in the second embodiment also, it is possible to perform determination of sheet deformation due to cockling with a high accuracy. Further, in the second embodiment, by performing the primer amount determination processing, it is possible to provide the primer to the non-printing area, reduce the difference in the moisture amount between the image printing area and the non-printing area, and suppress sheet deformation.

Modification Example

In the first embodiment, the example is explained in which the ink amount is determined and in the second embodiment, the example is explained in which the primer amount is determined, but it is also possible to set various printing conditions that affect sheet deformation. For example, in a configuration in which a unit configured to dry a printed material by a warm current of air is provided, it is possible to design the drying temperature and the drying air amount. Further, the printing speed also affects sheet deformation, and therefore, it is possible to design the printing speed similarly.

Third Embodiment

In the first embodiment, the example is explained in which the reference interval that is compared with the measured interval is obtained from the determination image. However, there is a case where a positional shift in printing is included in the grid pattern 603, which results from the accuracy of the image forming unit 107. In this case, it is difficult to separate the change in the interval between feature points into the change in the interval resulting from sheet deformation and the change in the interval resulting from the positional shift, and therefore, there is a case where the determination of sheet deformation errs. Consequently, in a third embodiment, a method of dealing with the above-described problem is explained. Points different from those of the embodiments described above are explained mainly and explanation of the same points as those of the above-described embodiments is omitted.

<Sheet Deformation Determination Processing Using Reference Image>

In the following, by using FIG. 6A, FIG. 6B, and FIG. 7, sheet deformation determination processing in the third embodiment is explained. FIG. 6A shows an example of the determination image and FIG. 6B shows an example of the reference image.

In the reference image, only the grid pattern 603 of the determination image is printed by using the K ink.

The third embodiment differs from the first embodiment in that the above-described reference image is used to obtain the reference interval at S703 in FIG. 7.

In the sheet deformation determination processing shown in FIG. 7, the processing at S701 and S702 is the same as that of the first embodiment and the interval between feature points of the determination image is calculated. After the interval between feature points of the determination image is calculated, the processing advances to S703.

At S703, different from the first embodiment, the reference interval between feature points is obtained by reading the above-described reference image printed by using only the K ink. After the reference interval between feature points is obtained, the processing advances to S704 and S705.

At S704 and S705, as in the first embodiment, the absolute value of the difference between the interval between feature points of the determination image and the reference interval between feature points is calculated and in a case where the absolute value is larger than a predetermined threshold value, the sheet deformation determination unit 308 determines that there is sheet deformation.

After this, as in the first embodiment, the flow of the color separation table selection processing shown in FIG. 5 is performed.

By performing the processing control explained above, according to the third embodiment, it is possible to perform determination of sheet deformation due to cockling with a high accuracy even in a case where the positional shift in printing resulting from the accuracy of the image forming unit 107 is included in the grid pattern 603.

The printing configuration may be one in which the determination image and the reference image are printed and scanned on separate paper sheets of the same type or one in which they are printed and scanned on one sheet. In the latter configuration, first, the reference image represented only by the grid pattern 603 is printed and scanned and then, the printed material is returned by using the double-sided printing conveyance mechanism and the uniform density pattern 604 is printed and scanned.

Fourth Embodiment

In the first embodiment, the example is explained in which the grid pattern 603 is printed in the K ink and the uniform density pattern 604 is printed in the Y ink. The reason the K ink and the Y ink are used is that in a case where the K ink whose density is relatively high is used, it is easy to obtain a feature point even in a case where the Y ink whose density is relatively low overlaps. That is, in order to obtain a feature point, the K ink is used and in order to provide moisture, the Y ink is used.

In the fourth embodiment, the present disclosure can be embodied also in a case of the determination image printed in one color ink. Points different from those of the embodiments described above are explained mainly and in a case where each individual piece of processing that is performed in the fourth embodiment is the same as the processing explained in the embodiments described above, explanation thereof is omitted.

Figure 11:
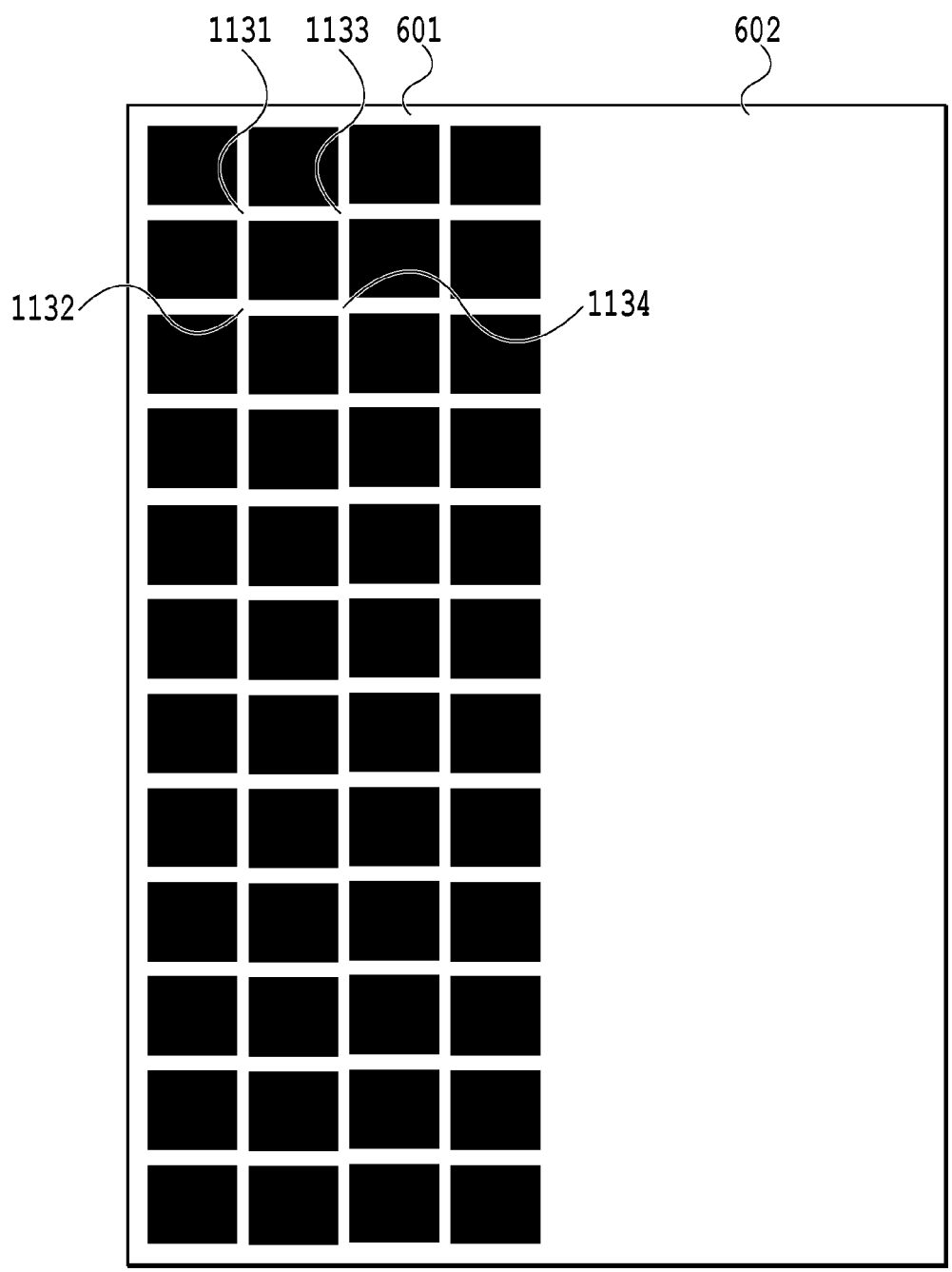
FIG. 11 is a diagram showing an example of a determination image in a fourth embodiment.

FIG. 11 is an example of a determination image in the fourth embodiment. As in FIG. 6A, the determination image includes the area 601 whose moisture amount is large and the area 602 whose moisture amount is low. The area 601 is a pattern printed in the K ink and in which a plurality of rectangles having a predetermined density is tiled with a gap in between. The color of the ink of the rectangular pattern may be arbitrary.

In this case, as shown in FIG. 11, it is possible to similarly obtain a point 1131 to a point 1134, which is each the gap between rectangular patterns, as feature points as in the case of the grid pattern 603. In a case where the point 1131 to the point 1134 in FIG. 11 can be obtained, it is possible to determine sheet deformation due to cockling by performing the sheet deformation determination processing of the first embodiment.

In the above, in a case where sheet deformation due to cockling occurs, the maximum value Vmax of the ink ejection amount is reduced and the color separation table selection processing of the first embodiment is performed. Due to this, it is possible to select an appropriate color separation table in which the sheet deformation due to cockling does not occur.

Further, it is also possible to apply the fourth embodiment to a configuration comprising a generation unit configured to generate a color separation table that reduces the ink ejection amount to Vmax or less, in place of selecting a color separation table.

Further, it may also be possible to employ a configuration in which a use is notified of the maximum ink ejection amount of the image forming apparatus and based on this value, the user sets the maximum ink ejection amount to an external color separation table generation unit. In a case where this method is employed, as described in the modification example of the first embodiment, it is possible for a user to determine the maximum ink ejection amount in which the sheet deformation due to cockling is not occurred.

In the above, the example is explained in which sheet deformation is determined by using only the change in the distance between feature points, but it may also be possible to use the sheet deformation determination by the change in density in combination therewith, which is explained as the conventional technique. For example, by determining that there is sheet deformation in a case where the change in the distance between feature points is larger than or equal to a predetermined value and the measured change in density is larger than or equal to a predetermined value, it is made possible to reduce the possibility of erroneous determination of sheet deformation.

Further, in FIG. 11, as the figure of the uniform density pattern in which it is possible to measure the distance between feature points, the rectangle is illustrated, but the figure of the uniform density pattern in which it is possible to measure the distance between feature points is not limited to this. For example, the figure may be a square, parallelogram, trapezoid, rhombus, triangle, circle or the like. Further, the figure of the uniform density pattern is not limited to the same shape and a pattern in which the size of the figure becomes larger gradually from the top end of the sheet may be acceptable, or a pattern in which the size of the figure becomes smaller gradually from the top end of the sheet may be acceptable.

By performing the processing control explained above, according to the fourth embodiment, it is possible to perform determination of sheet deformation due to cockling with a high accuracy even in a case where the determination image printed in one color ink is used.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-117064, filed Jul. 22, 2022, which is hereby incorporated by reference herein in its entirety.

What is claimed is:

1. An image forming apparatus that forms an image on a sheet by using a plurality of color inks, the image forming apparatus comprising:
   a reading unit configured to read a sheet on which a chart image is printed, the chart image including a first print pattern using a first color ink and a second print pattern using a second color ink whose color is different from the first color, containing at least part of the first print pattern, and having a predetermined density; and
   a detection unit configured to detect deformation of the sheet in an area of the sheet based on a difference between a moisture amount in a portion corresponding to an area in which the chart image in the read image obtained by the reading unit is printed and a moisture amount in a portion corresponding to a non-printing area.

2. The image forming apparatus according to claim 1, wherein
   the first print pattern is a pattern in which it is possible for the reading unit to obtain a distance between feature points in a sheet deformation direction of a specific design repeated regularly.

3. The image forming apparatus according to claim 2, wherein
the distance between feature points in the sheet deformation direction is shorter than a distance between feature points in a direction perpendicular to the sheet deformation direction.

4. The image forming apparatus according to claim 1, wherein
the first print pattern includes a plurality of edges or a plurality of corners.

5. The image forming apparatus according to claim 1, wherein
the second print pattern is a pattern whose used amount of the ink is larger than that of the first print pattern.

6. The image forming apparatus according to claim 1, wherein
a value of luminance that is measured by the reading unit in the first print pattern using the first color ink is lower than a value of luminance in the second print pattern using the second color ink.

7. The image forming apparatus according to claim 1, wherein
the reading unit reads a plurality of feature points in the sheet deformation direction from the printed chart image, and
the detection unit calculates a distance between feature points of the plurality of feature points and detects deformation of a sheet by using an absolute value of a difference between the distance between feature points of the plurality of feature points and a predetermined distance.

8. The image forming apparatus according to claim 7, wherein
the predetermined distance is a distance between feature points obtained from data of the chart image.

9. The image forming apparatus according to claim 7, wherein
the predetermined distance is a distance between feature points measured by the reading unit using a printed material on which only the first print pattern is printed.

10. The image forming apparatus according to claim 1, wherein
in a case where the chart image is printed, after only the first print pattern is printed, the sheet is dried and the second print pattern is printed.

11. The image forming apparatus according to claim 1, wherein
the reading unit reads a plurality of feature points in the sheet deformation direction from the printed chart image, and
the detection unit calculates a distance between feature points of the plurality of feature points and detects deformation of a sheet by using an absolute value of a difference between the distance between feature points of the plurality of feature points and a predetermined distance and a change in density in the sheet deformation direction measured by the reading unit.

12. A control method for an image forming apparatus that forms an image on a sheet by using a plurality of color inks, the control method comprising:
reading a sheet on which a chart image is printed, the chart image including a first print pattern using a first color ink and a second print pattern using a second color ink whose color is different from the first color, containing at least part of the first print pattern, and having a predetermined density; and
detecting deformation of the sheet in an area of the sheet based on a difference between a moisture amount in a portion corresponding to an area in which the chart image in the read image obtained by reading the sheet is printed and a moisture amount in a portion corresponding to a non-printing area.

13. A non-transitory computer readable storage medium storing a program for causing a computer to perform a control method for an image forming apparatus that forms an image on a sheet by using a plurality of color inks, the control method comprising:
reading a sheet on which a chart image is printed, the chart image including a first print pattern using a first color ink and a second print pattern using a second color ink whose color is different from the first color, containing at least part of the first print pattern, and having a predetermined density; and
detecting deformation of the sheet in an area of the sheet based on a difference between a moisture amount in a portion corresponding to an area in which the chart image in the read image obtained by reading the sheet is printed and a moisture amount in a portion corresponding to a non-printing area.

14. An image forming apparatus comprising:
a reading unit configured to read a sheet on which a chart image including specific designs is printed; and
a detection unit configured to detect deformation of the sheet in an area of the sheet based on a difference between a moisture amount in a portion corresponding to an area in which the chart image in the read image obtained by the reading unit is printed and a moisture amount in a portion corresponding to a non-printing area, wherein
each of the specific designs has a predetermined shape, an area larger than or equal to a predetermined size, and a predetermined density.

15. The image forming apparatus according to claim 14, wherein
the chart image has a pattern in which it is possible for the reading unit to obtain a distance between feature points repeated regularly in a sheet deformation direction.

16. The image forming apparatus according to claim 15, wherein
the distance between feature points in the sheet deformation direction is shorter than a distance between feature points in a direction perpendicular to the sheet deformation direction.

17. The image forming apparatus according to claim 14, wherein
the chart image includes a plurality of edges or a plurality of corners.

18. The image forming apparatus according to claim 14, wherein
the reading unit reads a plurality of feature points in the sheet deformation direction from the printed chart image, and
the detection unit calculates a distance between feature points of the plurality of feature points and detects deformation of a sheet by using an absolute value of a difference between the distance between feature points of the plurality of feature points and a predetermined distance.

19. The image forming apparatus according to claim 18, wherein
the predetermined distance is a distance between feature points obtained from data of the chart image.

20. The image forming apparatus according to claim 14, wherein
the reading unit reads a plurality of feature points in the sheet deformation direction from the printed chart image, and
the detection unit calculates a distance between feature points of the plurality of feature points and detects deformation of a sheet by using an absolute value of a difference between the distance between feature points of the plurality of feature points and a predetermined distance and a change in density in the sheet deformation direction measured by the reading unit.

21. A control method for an image forming apparatus comprising:
reading a sheet on which a chart image including specific designs is printed; and
detecting deformation of the sheet in an area of the sheet based on a difference between a moisture amount in a portion corresponding to an area in which the chart image in the read image obtained by reading the sheet is printed and a moisture amount in a portion corresponding to a non-printing area, wherein
each of the specific designs has a predetermined shape, an area larger than or equal to a predetermined size, and a predetermined density.

22. A non-transitory computer readable storage medium storing a program for causing a computer to perform a control method for an image forming apparatus, the control method comprising:
reading a sheet on which a chart image including specific designs is printed; and
detecting deformation of the sheet in an area of the sheet based on a difference between a moisture amount in a portion corresponding to an area in which the chart image in the read image obtained by reading the sheet is printed and a moisture amount in a portion corresponding to a non-printing area, wherein
each of the specific designs has a predetermined shape, an area larger than or equal to a predetermined size, and a predetermined density.

* * * * *